Nov. 27, 1956  E. UHER  2,771,977
CAM OPERATED CLUTCH
Filed Oct. 16, 1952  2 Sheets-Sheet 1
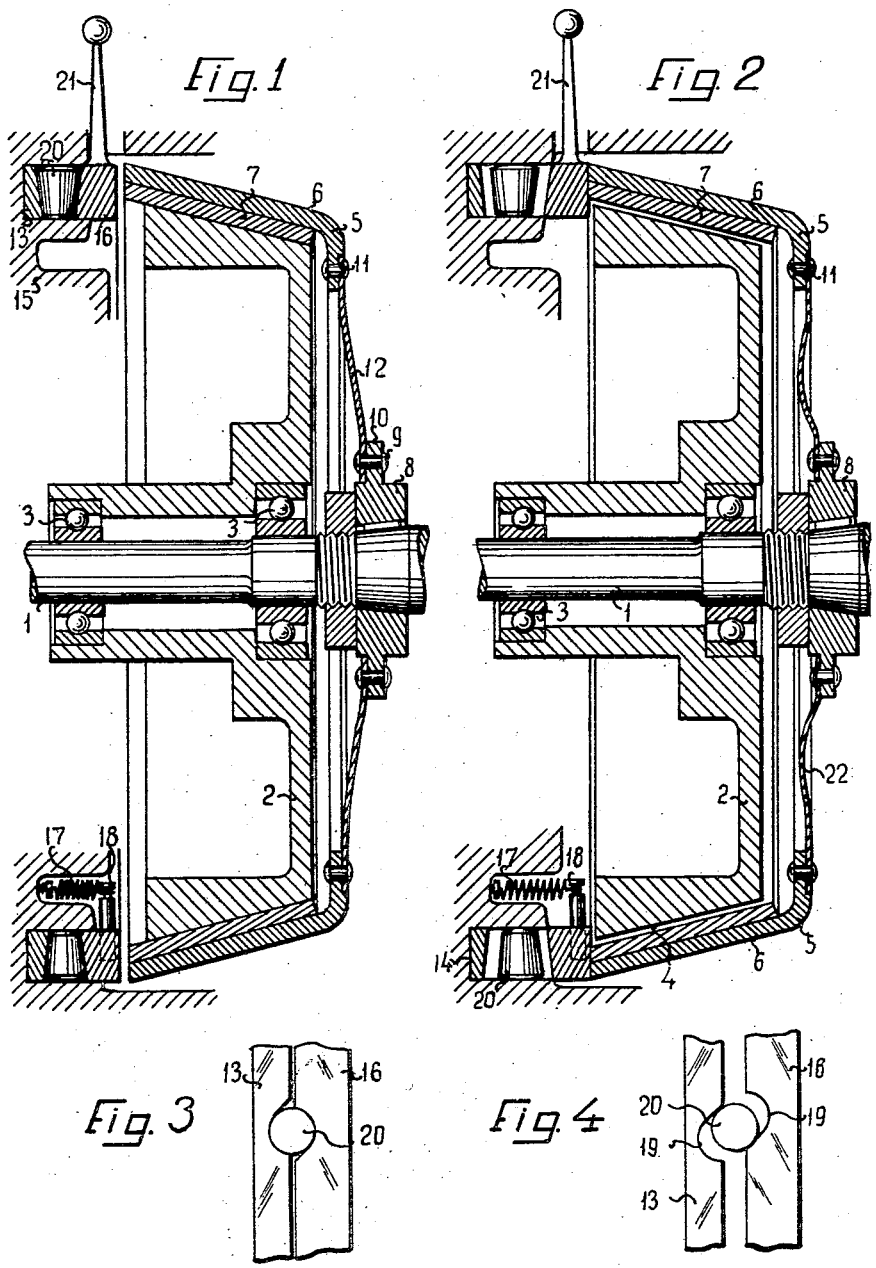
Inventor:
Edmond Uher
By Brown & Seward
Attorneys Nov. 27, 1956  E. UHER  2,771,977
CAM OPERATED CLUTCH
Filed Oct. 16, 1952  2 Sheets-Sheet 2

Inventor:
Edmond Uher
By Brown & Seward
Attorneys.

United States Patent Office 2,771,977
Patented Nov. 27, 1956

2,771,977

CAM OPERATED CLUTCH

Edmond Uher, Chemin des Mougins, Cap d'Antibes, Alpes Maritimes, France, assignor to Uher Engineering Company, Panama, Panama, a company of Panama Application October 16, 1952, Serial No. 315,029

Claims priority, application Germany February 9, 1952

3 Claims. (Cl. 192—93)

This invention relates to a cone friction coupling between a fly-wheel and a shaft coaxial therewith and, more particularly, between the crank-shaft of an internal combustion engine and a fly-wheel for starting and regulating said crank-shaft.

Couplings of this type are essentially constituted by a conical friction member relatively fast with the flywheel or even consituted by the fly-wheel itself, by a mating conical friction member rotatively fast with the shaft and by means to shift at least one of said conical members axially to clutch or declutch the coupling.

Now, it is preferred to shift axially that conical member which is rotatively fast with the shaft so that the fly-wheel may remain stationary in axial direction.

This arrangement is particularly suitable when the fly-wheel is rigid with the rotor of an electric motor as in electric fly-wheel starter for internal combustion engines.

In known couplings of this type, the axially movable conical member is made rotatively fast with the shaft through keys or similar slidable members which have the drawback of being liable to wear and even to break under the violent shocks to which they are subjected when the shaft is clutched with the fly-wheel.

One object of my invention is to provide a cone friction coupling of the type described, in which the axially movable conical member is interconnected with the shaft through an axially deformable spider having its outer periphery secured to said axially movable conical member and its inner periphery secured to a hub fixed on said shaft.

With this arrangement, the axial shift of the conical member is obtained by a deformation of the spider, i. e. without any relative sliding motion and the rotation torque is transmitted from the axially movable conical member to the shaft, or vice versa, through the circumferentially rigid spider.

Another object of the invention is to make the above-mentioned spider of a strong elastic metal and to give said spider the shape of a dish, which permits using said spider as a clutching elastic means.

This arrangement permits providing a particularly simple and, therefore, particularly cheap construction.

However, in certain cases, such an elastic spider may be unsufficiently strong to provide a suitable clutching pressure.

On the other hand, it is sometimes advantageous to provide means for adjusting said clutching pressure.

A further object of the invention is to provide a coupling of the type described in which the above-mentioned spider is continuously subjected to the action of one or more additional adjustable springs.

The spider which, according to the invention, ensures the interconnection of the axially movable conical member with the shaft offers the further advantage of permitting a certain freedom of orientation of said movable member, which ensures a perfect clutching engagement of the same on the mating axially immovable conical member.

Other objects and advantages of the invention will be apparent from the following detailed description taken in connection with the accompanying drawings, in which:

Fig. 1 is an axial cross-sectional view of a coupling according to the invention shown in clutched position.

Fig. 2 is an axial cross-sectional view of another embodiment of the coupling shown in declutched position.

Figs. 3 and 4 are detailed views of the declutching mechanism, respectively shown in clutched and declutched positions.

Figure 5:
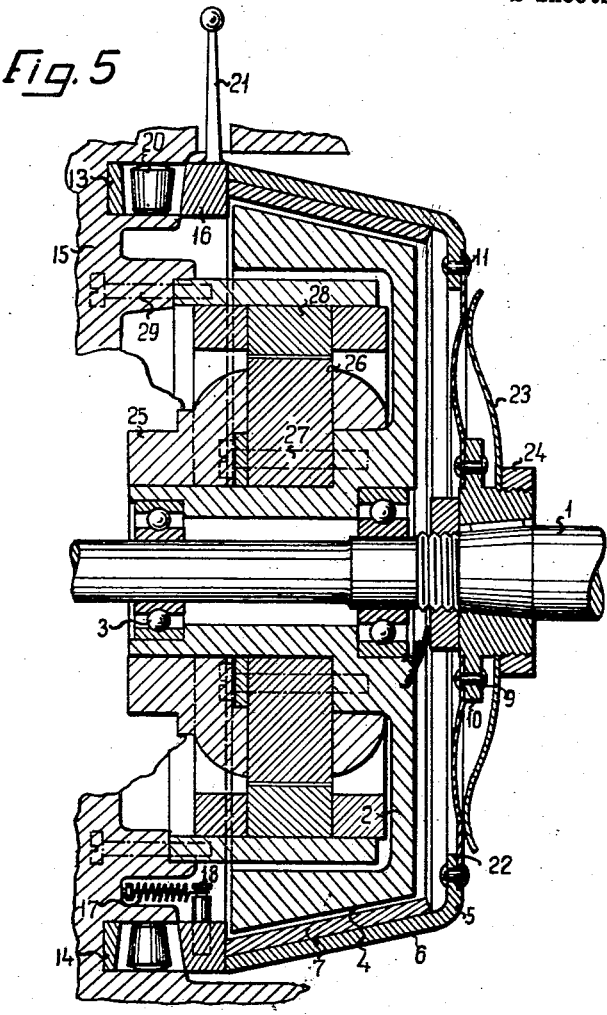
Fig. 5 is an axial cross-sectional view of an alternative embodiment of the elastic system of the coupling of Fig. 2, shown in declutched position.

Referring first to Figs. 1 and 2, there is shown at 1 a shaft which is to be coupled with a fly-wheel 2 coaxial therewith and freely journalled thereon through ball bearings 3.

In the example shown, the periphery of fly-wheel 2 has been given a conical shape, as shown at 4, so as to constitute in the same time a male coupling member. The female coupling member is essentially constituted by an annular disc 5 provided with a conical rim 6 on the inner face of which is secured a friction fitting 7. A hub 8 for said female coupling member is axially and rotatively fixed on shaft 1. A spider 12 which, in the example shown, has an annular dish-shape and is made of an elastic metal has its inner periphery secured, e. g. by rivets 9 on a flange 10 integral with hub 8 and its outer periphery secured e. g. by rivets 11 to the annular disc 5. The elastic spider 12 continuously urges the annular disc 5 toward flywheel 2 and thereby applies the friction fitting 7 of the conical rim 6 with a suitable pressure on the male friction conical surface 4 of fly-wheel 2. Moreover, since the spider 12 is secured on its both peripheries, it does not yield to torque stresses and therefore ensures transmission between shaft 1 and the female conical member 6, or vice versa, without any shock or wear. Finally, spider 12 leaves a certain degree of freedom to conical member 6, which constitutes in this manner a floating coupling member, so that it may be applied with a perfect contact on the male coupling member.

In the example shown, the declutching means are constituted by a fixed ring 13 embedded in an annular groove 14 provided for this purpose in a stationary member 15 and by a movable ring 16 engaged in said groove 14 and normally urged into annular contact with ring 13 by return springs 17 anchored at one end on the fixed member 15 and, at their other end, on pins 18 rigid with the movable ring 16. Oblique notches 19 are provided in the cooperating faces of the fixed ring 13 and the movable ring 16 and rollers 20 are freely journalled in said notches. As shown in Fig. 3, when the notches 19 of both rings register, the rollers 20 are completely embedded in said notches, so that the movable ring 16 is substantially held in contact with the fixed ring 13 under the action of spring 17. Now, if a relative angular displacement is imparted to the movable ring 16, e. g. by means of a hand lever 21, rollers 20 roll up the oblique walls or slopes of notches 19, so that the movable ring 16 is pushed away from the fixed ring 13 and comes into contact with the conical rim 6 of the coupling to shift the same axially into declutched position against the action of spider 12. If lever 21 is released, while rollers 20 have not overrun the edges of the notches, the movable ring 16 is brought towards the fixed ring 13 again by the return springs 17, while the conical rim 6—7 is applied in clutched position against the fly-wheel 2 under the action of spider 12.

In the embodiment shown in Fig. 2, the spider according to the invention has been given a special curvature, as shown at 22, so that its deformation in a generally axial direction does not tend to vary the diameter of the annular disc 5.

Figure 6:
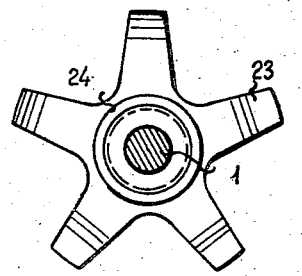
Fig. 6 is a detail view of the additional spring of the elastic system shown in Fig. 5.

In the embodiment of Figs. 5 and 6, an additional dish-shaped spring 23 which, in the example shown, is cut out in star fashion, is interposed between hub 2 and the spider 12 to reinforce the elastic action of the same. Moreover, a nut 24 is screwed on the outer threaded end of hub 2 to permit adjustment of the elastic system.

As mentioned in the preamble, the coupling according to the invention is particularly intended to be interposed between the electrically driven fly-wheel of an inertia starter and the crank-shaft of an internal combustion engine to be started thereby.

Fig. 5 shows an electric motor 25, the rotor 26 of which is secured to fly-wheel 2, e. g. by means of screws 27. 28 is the stator of motor 25. Stator 28 is secured, e. g. by a screw 29, on fixed member 15 which, in this case, may be rigid with the casing of the internal combustion engine.

In this particular application, the axial immovable arrangement of fly-wheel 2 offers the further advantage that no relative axial shift is ever caused between rotor 26 and stator 28.

What is claimed is:

1. A cone friction coupling betwen a fly-wheel and a shaft coaxial therewith, comprising, in combination, bearing means to journal said fly-wheel on said shaft, a friction conical member rigid with said fly-wheel, a hub on said shaft, an annular disc having a conical rim adapted to be frictionally engaged on said friction cone, an elastic dish-shaped spider having its outer periphery secured to said annular disc and its inner periphery secured to said hub to continuously urge said annular disc toward said flywheel to thereby clutch said rim with said friction cone, a dish-shaped annular spring having its inner periphery bearing on said hub and its outer periphery applied on said spider, and means to declutch said rim from said cone against the action of said elastic dish-shaped spider.

2. A cone friction coupling according to claim 1, further comprising a nut interposed between the inner periphery of said dish-shaped annular spring and said hub to axially adjust the bearing position of said annular spring inner periphery on said hub.

3. A cone friction coupling between a fly-wheel and a shaft coaxial therewith comprising, in combination, bearing means to journal said fly-wheel on said shaft, a friction conical member rigid with said fly-wheel, a hub on said shaft, an annular disc having a conical rim adapted to be frictionally engaged on said friction cone, an elastic system, including a spider having its outer periphery secured to said annular disc and its inner periphery secured to said hub, to continuously urge said annular disc toward said fly-wheel to thereby clutch said rim with said friction cone and means to declutch said rim from said cone against the action of said elastic system.

References Cited in the file of this patent

UNITED STATES PATENTS

| 203,808 | Williamson | May 14, 1878 |
| 716,754 | Rivert | Dec. 23, 1902 |
| 1,014,990 | Ahlborn | Jan. 16, 1912 |
| 1,419,607 | Bowman et al. | June 13, 1922 |
| 1,917,999 | Spear | July 11, 1933 |

FOREIGN PATENTS

| 136,986 | Switzerland | 1930 |
| 170,692 | Great Britain | 1921 |